Sept. 11, 1962 P. Z. INGERMAN 3,054,059

PATTERN SUPPRESSED COUNTER CIRCUIT

Filed Aug. 8, 1960 4 Sheets-Sheet 1

INVENTOR.
PETER ZILAHY INGERMAN
BY
Robert D. Sandon
ATTORNEY

| | 1 | | 2 | | 3 | | 4 | | 5 | | 6 | | 7 | | 8 | | 9 | | 10 | |
|---|---|---|---|---|---|---|---|---|---|---|---|---|---|---|---|---|---|---|---|---|
| | A | B | A | B | A | B | A | B | A | B | A | B | A | B | A | B | A | B | A | B |
| 50 | 1 | 1 | 1 | 1 | 1 | 1 | 1 | 1 | 1 | 1 | 0 | 0 | 0 | 0 | 0 | 0 | 0 | 0 | 0 | 0 |
| 49 | 1 | 1 | 1 | 1 | 1 | 1 | 1 | 1 | 1 | 0 | 0 | 0 | 0 | 0 | 0 | 0 | 0 | 0 | 0 | 1 |
| 48 | 1 | 1 | 1 | 1 | 1 | 1 | 1 | 1 | 0 | 0 | 0 | 0 | 0 | 0 | 0 | 0 | 0 | 0 | 1 | 1 |
| 47 | 1 | 1 | 1 | 1 | 1 | 1 | 1 | 0 | 0 | 0 | 0 | 0 | 0 | 0 | 0 | 0 | 0 | 1 | 1 | 1 |
| 46 | 1 | 1 | 1 | 1 | 1 | 1 | 0 | 0 | 0 | 0 | 0 | 0 | 0 | 0 | 0 | 0 | 1 | 1 | 1 | 1 |
| 45 | 1 | 1 | 1 | 1 | 1 | 0 | 0 | 0 | 0 | 0 | 0 | 0 | 0 | 0 | 0 | 1 | 1 | 1 | 1 | 1 |
| 44 | 1 | 1 | 1 | 1 | 0 | 0 | 0 | 0 | 0 | 0 | 0 | 0 | 0 | 0 | 1 | 1 | 1 | 1 | 1 | 1 |
| 43 | 1 | 1 | 1 | 0 | 0 | 0 | 0 | 0 | 0 | 0 | 0 | 0 | 0 | 1 | 1 | 1 | 1 | 1 | 1 | 1 |
| 42 | 1 | 1 | 0 | 0 | 0 | 0 | 0 | 0 | 0 | 0 | 0 | 0 | 1 | 1 | 1 | 1 | 1 | 1 | 1 | 1 |
| 41 | 1 | 0 | 0 | 0 | 0 | 0 | 0 | 0 | 0 | 0 | 0 | 1 | 1 | 1 | 1 | 1 | 1 | 1 | 1 | 1 |

| | 1 | | 2 | | 3 | | 4 | | 5 | | 6 | | 7 | | 8 | | 9 | | 10 | |
|---|---|---|---|---|---|---|---|---|---|---|---|---|---|---|---|---|---|---|---|---|
| | A | B | A | B | A | B | A | B | A | B | A | B | A | B | A | B | A | B | A | B |
| 50 | 0 | 0 | 1 | 1 | 1 | 1 | 1 | 1 | 1 | 1 | 1 | 1 | 0 | 0 | 0 | 0 | 0 | 0 | 0 | 0 |
| 49 | 0 | 1 | 1 | 1 | 1 | 0 | 0 | 1 | 1 | 1 | 1 | 0 | 0 | 0 | 0 | 0 | 0 | 0 | 0 | 0 |
| 48 | 1 | 1 | 1 | 1 | 0 | 0 | 1 | 1 | 1 | 1 | 0 | 0 | 0 | 0 | 0 | 0 | 0 | 0 | 0 | 0 |
| 47 | 1 | 1 | 1 | 0 | 0 | 1 | 1 | 1 | 1 | 0 | 0 | 0 | 0 | 0 | 0 | 0 | 0 | 0 | 0 | 1 |
| 46 | 1 | 1 | 0 | 0 | 1 | 1 | 1 | 1 | 0 | 0 | 0 | 0 | 0 | 0 | 0 | 0 | 0 | 0 | 1 | 1 |
| 45 | 1 | 0 | 0 | 1 | 1 | 1 | 1 | 0 | 0 | 0 | 0 | 0 | 0 | 0 | 0 | 0 | 0 | 1 | 1 | 1 |
| 44 | 0 | 0 | 1 | 1 | 1 | 1 | 0 | 0 | 0 | 0 | 0 | 0 | 0 | 0 | 0 | 0 | 1 | 1 | 1 | 1 |
| 43 | 0 | 1 | 1 | 1 | 1 | 0 | 0 | 0 | 0 | 0 | 0 | 0 | 0 | 0 | 0 | 1 | 1 | 1 | 1 | 1 |
| 42 | 1 | 1 | 1 | 1 | 0 | 0 | 0 | 0 | 0 | 0 | 0 | 0 | 0 | 0 | 1 | 1 | 1 | 1 | 1 | 1 |
| 41 | 1 | 1 | 1 | 0 | 0 | 0 | 0 | 0 | 0 | 0 | 0 | 0 | 0 | 1 | 1 | 1 | 1 | 1 | 1 | 1 |

↑68 ↑69

INVENTOR.
PETER ZILAHY INGERMAN
BY
Robert D. Sanborn
ATTORNEY

PATTERN SUPPRESSED COUNTER CIRCUIT

Filed Aug. 8, 1960 4 Sheets-Sheet 3

| | 1 | | 2 | | 3 | | 4 | | 5 | | 6 | | 7 | | 8 | | 9 | | 10 | |
|---|---|---|---|---|---|---|---|---|---|---|---|---|---|---|---|---|---|---|---|---|
| | A | B | A | B | A | B | A | B | A | B | A | B | A | B | A | B | A | B | A | B |
| 50 | 0 | 0 | 1 | 1 | 1 | 1 | 1 | 1 | 1 | 1 | 1 | 1 | 0 | 0 | 0 | 0 | 0 | 0 | 0 | 0 |
| 49 | 0 | 1 | 1 | 1 | 1 | 1 | 1 | 0 | 0 | 1 | 1 | 0 | 0 | 0 | 0 | 0 | 0 | 0 | 0 | 0 |
| 48 | 1 | 1 | 0 | 0 | 1 | 1 | 0 | 0 | 1 | 1 | 0 | 0 | 0 | 0 | 0 | 0 | 0 | 0 | 0 | 0 |
| 47 | 1 | 0 | 0 | 1 | 1 | 0 | 0 | 1 | 1 | 0 | 0 | 0 | 0 | 0 | 0 | 0 | 0 | 0 | 0 | 1 |
| 46 | 0 | 0 | 1 | 1 | 0 | 0 | 1 | 1 | 0 | 0 | 0 | 0 | 0 | 0 | 0 | 0 | 0 | 0 | 1 | 1 |
| 45 | 0 | 1 | 1 | 0 | 0 | 1 | 1 | 0 | 0 | 0 | 0 | 0 | 0 | 0 | 0 | 0 | 0 | 1 | 1 | 1 |
| 44 | 1 | 1 | 0 | 0 | 1 | 1 | 0 | 0 | 0 | 0 | 0 | 0 | 0 | 0 | 0 | 0 | 1 | 1 | 1 | 1 |
| 43 | 1 | 0 | 0 | 1 | 1 | 0 | 0 | 0 | 0 | 0 | 0 | 0 | 0 | 0 | 0 | 1 | 1 | 1 | 1 | 1 |
| 42 | 0 | 0 | 1 | 1 | 0 | 0 | 0 | 0 | 0 | 0 | 0 | 0 | 0 | 0 | 1 | 1 | 1 | 1 | 1 | 1 |
| 41 | 0 | 1 | 1 | 0 | 0 | 0 | 0 | 0 | 0 | 0 | 0 | 0 | 0 | 1 | 1 | 1 | 1 | 1 | 1 | 1 |
| | | | | 68 | | | | 68 | 69 | | | | | | | | | | | |

| | 1 | | 2 | | 3 | | 4 | | 5 | | 6 | | 7 | | 8 | | 9 | | 10 | |
|---|---|---|---|---|---|---|---|---|---|---|---|---|---|---|---|---|---|---|---|---|
| | A | B | A | B | A | B | A | B | A | B | A | B | A | B | A | B | A | B | A | B |
| 50 | 0 | 0 | 1 | 1 | 1 | 1 | 1 | 1 | 1 | 1 | 1 | 1 | 1 | 0 | 0 | 0 | 0 | 0 | 0 | 0 |
| 49 | 0 | 1 | 1 | 0 | 0 | 1 | 1 | 1 | 0 | 0 | 1 | 1 | 0 | 0 | 0 | 0 | 0 | 0 | 0 | 0 |
| 48 | 1 | 1 | 0 | 0 | 1 | 1 | 1 | 0 | 0 | 1 | 1 | 0 | 0 | 0 | 0 | 0 | 0 | 0 | 0 | 0 |
| 47 | 1 | 0 | 0 | 1 | 1 | 1 | 0 | 0 | 1 | 1 | 0 | 0 | 0 | 0 | 0 | 0 | 0 | 0 | 0 | 0 |
| 46 | 0 | 0 | 1 | 1 | 0 | 0 | 0 | 1 | 1 | 0 | 0 | 0 | 0 | 0 | 0 | 0 | 0 | 0 | 0 | 1 |
| 45 | 0 | 1 | 1 | 0 | 0 | 0 | 1 | 1 | 0 | 0 | 0 | 0 | 0 | 0 | 0 | 0 | 0 | 0 | 1 | 1 |
| 44 | 1 | 1 | 0 | 0 | 1 | 1 | 1 | 0 | 0 | 0 | 0 | 0 | 0 | 0 | 0 | 0 | 0 | 1 | 1 | 1 |
| 43 | 1 | 0 | 0 | 1 | 1 | 1 | 0 | 0 | 0 | 0 | 0 | 0 | 0 | 0 | 0 | 0 | 1 | 1 | 1 | 1 |
| 42 | 0 | 0 | 1 | 1 | 0 | 0 | 0 | 0 | 0 | 0 | 0 | 0 | 0 | 0 | 0 | 1 | 1 | 1 | 1 | 1 |
| 41 | 0 | 1 | 1 | 0 | 0 | 0 | 0 | 0 | 0 | 0 | 0 | 0 | 0 | 0 | 1 | 1 | 1 | 1 | 1 | 1 |
| | | | | | 69 | | | | | 69 | | | | | | | | | | |

| | 1 | | 2 | | 3 | | 4 | |
|---|---|---|---|---|---|---|---|---|
| | A | B | A | B | A | B | A | B |
| 203 | 0 | 0 | 1 | 1 | 1 | 1 | 0 | 0 |
| 202 | 0 | 0 | 0 | 1 | 1 | 0 | 0 | 0 |
| 201 | 0 | 1 | 1 | 1 | 0 | 0 | 0 | 1 |

INVENTOR.
PETER ZILAHY INGERMAN
BY
Robert D. Sanborn
ATTORNEY

INVENTOR.
PETER ZILAHY INGERMAN
BY
Robert D. Sanborn
ATTORNEY

United States Patent Office 3,054,059
Patented Sept. 11, 1962

3,054,059

PATTERN SUPPRESSED COUNTER CIRCUIT

Peter Zilahy Ingerman, Philadelphia, Pa., assignor, by mesne assignments, to Philco Corporation, Philadelphia, Pa., a corporation of Delaware

Filed Aug. 8, 1960, Ser. No. 48,177
13 Claims. (Cl. 328—42)

The present invention relates to counter circuits and more particularly to ring counters which employ bistable elements in cascade.

Computer circuits, digital computer systems and many other complex electrical and electromechanical equipments employ sequencing circuits which cause the system to perform prescribed operations in a preselected order. In some instances this is most easily accomplished by providing a sequencing circuit which has a plurality of output shafts, terminals or leads which are actuated or energized singly in a preselected order.

One such sequencing circuit comprises bistable multivibrators connected in a ring by means of suitable "and" gate circuits. Alternate gate circuits around the ring constitute a set. The two sets of gate circuits thus formed are enabled alternately from a suitable source of stepping pulses. This enabling of the gate circuits causes the pattern of conduction in the various multivibrators to progress around the ring in sequence with the applied stepping pulses. Coincidence circuits connect selected outputs of the multivibrators to the output terminals or connections of the sequencing circuit. The points of connection of the coincidence circuits are selected so that the output connections are energized in a preselected manner, for example singly in a preselected sequence.

Sequencing circuits of this type operate satisfactorily if less than six bistable multivibrators are included in the chain. However if six or more multivibrators are included in the chain, interfering signals or momentary malfunction of one of the elements of the ring may result in the establishment and continued propagation of a conduction pattern which is other than the desired conduction pattern. If the conduction pattern which is propagated in the circuit is other than the desired conduction pattern, the output terminals may be energized in other than their proper sequence or more than one output terminal may be energized at once.

The copending application of John L. Robinson, Serial No. 26,129, filed May 2, 1960, discloses and claims a pattern suppression circuit suitable for scale of eight ring counters.

It is an object of the present invention to provide pattern suppression means for ring counter chains of any length.

Another object is to provide a pattern suppression circuit which is applicable to even count and odd count ring counters.

A further object of the present invention is to provide improved counter chains which revert from undesired to desired counting modes in a minimum of stepping signal cycles.

These and other objects of the present invention are achieved by providing in a chain composed of a plurality of bistable elements, a plurality of pattern suppression loops, each of said loops including a bistable element of the chain which is controlled jointly by the stepping signals supplied to the circuit, the state of the preceding bistable element in said chain and the state of an additional bistable element elsewhere in the chain, the spacing between the additional controlling bistable element and the controlled bistable element being different for each pattern suppression loop.

As indicated above the bistable multivibrator is one preferred form of bistable element which may be employed in a counter chain. However it is to be understood that the present invention is not limited in its application to multivibrator counter chains. It is applicable also to counter chains employing relays, mechanical toggles or other forms of bistable electrical, electromechanical or mechanical bistable elements. It will become apparent as the description of the invention proceeds that the invention is also applicable to counter chains which employ more than one type of bistable element in the chain, for example counter chains which employ both bistable multivibrators and relays having two stable states. Since the fundamental principles of the present invention may be fully illustrated and explained by reference to a multivibrator counter chain, only this type of counter chain will be described in detail herein.

For a better understanding of the present invention together with other and further objects thereof reference should now be made to the following detailed description which is to be read in conjunction with the accompanying drawings in which.

Figures 1, 2:
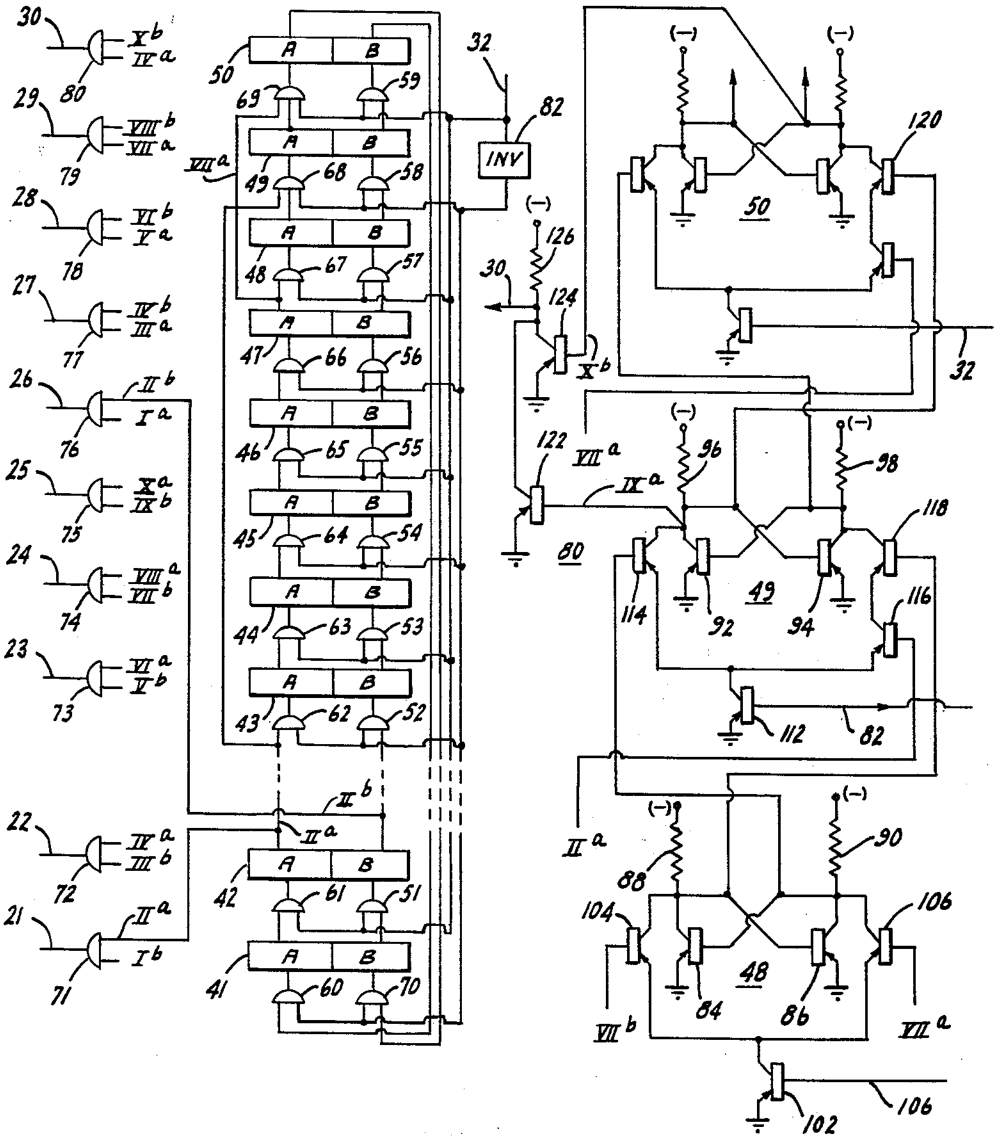
FIG. 1 is a block diagram of a ten-count ring counter which embodies the present invention.
FIG. 2 is a schematic diagram of a selected, representative portion of the embodiment of FIG. 1.

The embodiment shown in FIG. 1 is a "scale of ten" counter, that is, it has ten bistable elements represented by the double rectangles 41 through 50. In the following description it will be assumed that these bistable elements are bistable multivibrators. Multivibrators 41 through 50 are preferably symmetrical multivibrator circuits. In the description which follows, one half of each multivibrator will be designated the "A" side and the other half will be designated the "B" side. Each multivibrator has two stable states. Therefore it is convenient to use the binary notation and refer to one stable state as the "zero" state of the multivibrator and the other state as the "one" state of the multivibrator. This terminology will be employed throughout the specification. Since the circuits are symmetrical, it is immaterial which state is designated as the "zero" state and which is designated as the "one" state. However in order to facilitate the description it will be assumed that when the output of the "A" side of the multivibrator is at a relatively negative potential, the multivibrator is in the "zero" state and when the output of the "A" side is near ground potential, the multivibrator is in the "one" state. Gate circuits 51 through 59 couple the "B" side of each of the multivibrators 41 through 49 to the "B" side of the following multivibrator in the chain. A similar gate circuit 60 couples the "B" side of multivibrator 50 to the "A" side of multivibrator 41. A second series of gate circuits 61 through 69 couple the "A" side of multivibrators 41 through 49 to the "A" side of the following multivibrator. The tenth gate ciriuit 70 of this series couples the "A" side of multivibrator 50 to the "B" side of multivibrator 41. All of the gate circuits 51–60 and 61–70 are two input coincidence gates with the exception of gate circuits 68 and 69. Gates 68 and 69 are three input coincidence gates. As will be explained in more detail later, gates 68 and 69 are the pattern suppression gates in the circuit of FIG. 1.

The type of output circuit employed with the counter of FIG. 1 will depend upon the particular application of this circuit. However, by way of illustration, it will be assumed that ten output terminals 21 through 30 are to be energized one at a time in sequence in response to ten successive stepping signals. To accomplish this the outputs of multivibrators 41 through 50 are also connected to a third series of gate circuits 71 through 80. Only the connections from multivibrator 42 to the gate circuits 71 and 76 have been shown in FIG. 1 in order to simplify the drawing. The remaining connections are indicated schematically by the reference numerals $I^a$ to $X^a$ and $I^b$ to $X^b$ at the inputs of gates 71–80. As will be seen in FIG. 1, the reference numerals $II^a$ and $II^b$ designate the outputs of the "A" and "B" sides of multivibrator 42. Similarly reference numerals $I^a$ and $I^b$ designate the outputs of the "A" side and "B" side of multivibrator 41 etc., the Roman numeral in each case corresponding to the unit digit of the reference numeral of the respective multivibrator. Gates 71 through 80 are again two input coincidence gates. They may be similar to gates 51 or 61, for example. In the following description it will be assumed that gate 71, for example, is of the type which will cause the output lead 21 to be at one potential if either one or both of the input connections $I^b$ and $II^a$ are at a relatively negative potential and at a different potential if both of the two inputs are near ground potential. However it lies within the scope of the invention to provide coincidence gate circuits which cause the output connection to be at one potential if both input leads are at a relatively negative potential and at a different potential if less than both (i.e. one or neither) input leads are at a relatively negative potential. One preferred form of coincidence circuit is shown in more detail in FIG. 2.

As mentioned above, gates 51 through 60, 61 through 67 and 70 are two input coincidence circuits. These circuits are such that both inputs must be at a relatively negative potential before the gate is operative. Gate circuits 68 and 69 are three input coincidence circuits in which all three inputs must be at a relatively negative potential before the gate is operative. As shown in FIG. 1, one input of gates 51 through 60 is energized by the "B" side of the respective multivibrators 41–50 associated therewith. The second input of gates 51, 53, 55, 57 and 59 are supplied with a control signal directly from the stepping signal input connection 32. If one of the gates, for example gate 51, has one input thereof at a relatively negative potential by reason of a signal supplied by input connection 32 the gate is said to be "enabled." That is, a conductive path may be completed through this gate by causing the other input connection to be at a negative potential. The second inputs of gates 52, 54, 56, 58 and 60 are coupled to the output of inverter 82 which has its input connected to the stepping signal input connection 32. One input of each of gates 61 through 70 is coupled to the output of the "A" side of multivibrators 41–50, respectively. A second input of each of the gate circuits 61, 63, 65, 67 and 69 is coupled directly to the input connection 32. The second input of each of the gates 62, 64, 68 and 70 is coupled to the output of inverter 82.

The third input of gate 68 is coupled to the output $II^a$ of the "A" side of multivibrator 42. The third input of gate circuit 69 is coupled to the output $VII^a$ of the "A" side of multivibrator 47.

The gate pairs 51–61, 52–62, etc. form double path, signal actuated gate circuits which permit transfer of data from one multivibrator to the next. Gate circuits 51 and 61 have been shown as separate circuits even though both are enabled directly by input lead 32. As will be seen in FIG. 2, certain economy of parts can be achieved by combining portions of gates 51 and 61 and by combining like portions of the other gate pairs such as gates 52 and 62, 53 and 63, etc.

FIG. 2 illustrates one preferred form which the multivibrators 48, 49 and 50 and the gate circuits associated therewith may take. FIG. 2 may be taken as representative of any of the multivibrators in the circuit provided it is understood that three input coincidence gates are included only between multivibrators 48 and 49 and multivibrators 49 and 50 and that the connections from the "A" and "B" sides of multivibrator 50 are to the "B" and "A" sides, respectively, of multivibrator 41. The circuit of FIG. 2 employs direct coupled transistor logic which is now well known in the computer art. However the invention is not to be limited to transistor circuits or to the particular logic shown. Only one output coincidence gate 80 is shown in FIG. 2 in order to simplify the drawing. The connection of the other coincidence gates 71–79 is believed to be obvious from the showing of gate 80.

Turning now to multivibrator 48 at the lower end of FIG. 2 it will be seen that multivibrator 48 comprises two transistors 84 and 86 and the associated collector resistors 88 and 90. The collector electrode or collector of transistor 84 is connected directly to the base electrode or base of transistor 86. Similarly the collector of transistor 86 is connected to the base of transistor 84. The multivibrator circuit thus formed has two electrically stable states. That is, if by any conventient means the collector potential of transistor 84 is brought to or near ground potential, this will turn transistor 86 off and cause the collector of this transistor 86 to be at the relatively negative source potential. The collector bias source is represented by the minus sign (−) in FIG. 2. Since the collector of transistor 86 is at a relatively negative potential, it will maintain transistor 84 in the conducting condition and maintain the collector potential of this transistor 84 at or near ground potential. Conversely, if the collector potential of transistor 86 is brought to near ground potential, transistor 84 will be cut off and the collector of this transistor will assume a relatively negative potential. This negative potential will render transistor 86 conductive and maintain the potential of the collector of transistor 86 near ground potential. Multivibrator 49 is similarly composed of two transistors 92 and 94 with the associated collector resistors 96 and 98.

The functions of the two gate circuits 57 and 67 of FIG. 1 are performed by three transistors 102, 104 and 106. Transistors 102 and 104 form a two input "and" gate which corresponds in function to gate 66 of FIG. 1. Similarly transistors 102 and 106 perform the function of "and" gate 57 of FIG. 1. The function of "and" gate 58 of FIG. 1 is performed by transistors 112 and 114. It can be seen from FIG. 2 that if transistor 86 is not conducting and the collector of this transistor is at a negative potential, the collector of transistor 92 will be placed at or near ground potential by the conductive path provided by transistors 112 and 114. Placing the collector of transistor 92 at or near ground potential will place the collector of transistor 94 at a negative potential which corresponds to the negative potential of the collector of transistor 86 in multivibrator 48.

The functions of gate 68 are performed in FIG. 2 by transistors 112, 116 and 118. Lead $II^a$ in FIG. 2 corresponds to the similarly numbered output connection in FIG. 1. That is, it corresponds to the output of the "A" side of multivibrator 42. Transistors 112, 116 and 118 of FIG. 2 form what is known as a "three-high and gate." The bases of all three transistors must be at a negative potential before a circuit is completed from the collector electrode of transistor 94 to ground.

The gate circuits connecting multivibrator 49 to multivibrator 50 are identical to those which connect multivibrator 48 to multivibrator 49. Therefore these gate circuits will not be described in detail. It will be noted however that transistor 120 in the "three-high and gate" circuit which connects multivibrator 49 to multivibrator 50 is energized by the output $VII^a$ from the "A" side of multivibrator 47 rather than output $II^a$ which energizes transistor 118.

The coincidence circuit 80 in FIG. 2 comprises two transistors 122 and 124 which share a common collector impedance 126. It will be seen that if either transistor 122 or 124 or both of these transistors is conductive, the common collector terminal will be at a potential near ground potential. If both of these transistors are nonconducting then the common collector potential, which corresponds to output lead 30, will be at a relatively negative potential. The base of transistor 124 is energized by output connection $X^b$ from the "B" side of multivibrator 50. The base of transistor 122 is energized by output $IX^a$ from the "A" side of multivibrator 49.

The operation of the circuit of FIG. 1 will now be explained. The signal supplied at input 32 is shown at A in FIG. 1A. It will be seen that this signal is a symmetrical square wave. This is illustrative only of one signal which will step the counter chain of FIG. 1. The condition of conduction of multivibrators will change on each alternation of the stepping signal. Therefore the two "half cycles" may be equal or unequal in duration and the cycles may be either regular or irregular in their recurrence rate. Furthermore, the stepping signal waveshape may be other than rectangular, e.g. sinusoidal or sawtooth. The gate circuits 51, 53, 55, 57 and 59 and 61, 63, 65, 67 and 69 are enabled by the negative half cycles 130 and 132. The output of inverter 82 is shown at B in FIG. 1A. The gates coupled to the output of inverter 82 are enabled by the negative half cycles 134 and 136. It will be noted that these are the half cycles intermediate half cycles 130, 132, etc. of waveform A.

Figures 3, 4, 6:
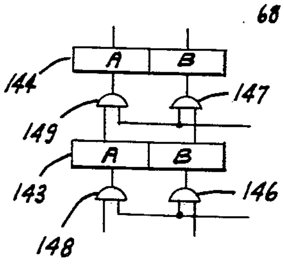
FIG. 3 is a table which illustrates a preferred sequence of operation of the embodiment of FIG. 1.
FIGS. 4 and 5 are tables which illustrate the suppression of undesired conduction patterns by the pattern suppression loops of the circuit of FIG. 1.
FIG. 6 is a block diagram of a unit which may be employed to extend the length of the counter chain of FIG. 1.

Assume for the moment that all of the multivibrators 41–50 are in the "one" state. FIG. 3 is a table showing the condition of conduction of the multivibrators of FIG. 1 on successive half cycles of the stepping signal on input 32. The numbered columns 1 through 10 correspond to ten successive cycles of the stepping signal. The subcolumns designated A and B correspond to the two half cycles of each numbered cycle. Thus column 1A of FIG. 3 corresponds to the condition of conduction of the multivibrators 41–50 on the half cycle 130 of the stepping signal on input 32. Column 1B corresponds to the condition of these multivibrators on the next half cycle of the stepping signal, i.e. the half cycle 134 from inverter 82. As will be explained later, the pattern of a ten-count counter repeats cyclically every twenty half cycles, i.e. every ten cycles.

Let it be assumed that each of the multivibrators 41–50 is initially in the "one" state. The manner in which the multivibrators arrived at this state is immaterial since, as will be pointed out later, the circuit will achieve this assumed state after relatively few timing pulses starting from any random state of conduction of the multivibrators 41–50. The terms "compatible state," "incompatible state" and "incompatibility" as used in the following description are defined as follows: If two adjacent multivibrators are in such a state that energizing either one of the two gates connecting these two multivibrators will cause the multivibrator following the gate to be reset, the multivibrators are said to be in "incompatible" states. It will be assumed that the "incompatibility" exists between the multivibrators which are in incompatible states rather than in either multivibrator per se. If energizing the gate circuits between two multivibrators produces no change in state in the multivibrator following the gate, the multivibrators are said to be in a "compatible state." It is convenient also to keep in mind that, by definition, an incompatibility exists between multivibrators 41 through 49 and the next following multivibrator (e.g. between multivibrators 41 and 42, 42 and 43, etc.) if the preceding multivibrator is set to the "zero" or "one" state and the following multivibrator is set to the opposite state. An incompatibility exists between multivibrators 50 and 41 if the two multivibrators are in the same state. This difference is due to the cross connection from the "A" and "B" sides of multivibrator 50 to the "B" and "A" sides, respectively, of multivibrator 41. The incompatibilities are represented in FIG. 3 by the horizontal dashes.

Before taking up the actual operation of the circuit of FIG. 1, it may be helpful to note that if the multivibrators are in the states represented in column 1A of FIG. 3 and all of the gates 51 through 59 and 61 through 69 were enabled at one time, no change in the pattern of conduction of the multivibrators would take place. That is, each of the multivibrators 41 through 49 is in a "compatible state" with the one which follows. However, gates 60 and 70 connect multivibrator 50 which is in the "one" state to multivibrator 41 which is in the "one" state. Thus an incompatibility exists between multivibrator 50 and multivibrator 41. If gates 60 and 70 were enabled alone, multivibrator 41 would be set to the "zero" state. This removes the incompatibility from between multivibrators 50 and 41. However an incompatibility now exists between multivibrators 41 and 42. It is convenient to assume that the action of gates 60 and 70 is to transfer the incompatibility which existed between multivibrators 38 and 31 to the position between multivibrators 31 and 32.

Figure 1A:
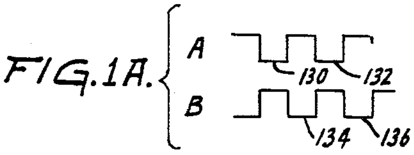
FIG. 1A is a plot showing typical stepping signals which may be supplied to the embodiment of FIG. 1.

Returning now to the condition assumed for the first half cycle of the stepping signal which is represented in column 1A of FIG. 3, it will be seen that one input of each of the gate circuits 51, 53, 55, 57 and 59 and 61, 63, 65, 67 and 69 is enabled by the signal on lead 32 during the negative half cycle 130 of FIG. 1A. A direct connection will be established between multivibrators 41 and 42, 43 and 44, 45 and 46, 47 and 48, 49 and 50 through gates 51, 53, 55, 57 and 59, respectively. Since no incompatibility exists between these various pairs of multivibrators, no change in the conduction of the pattern of the circuit will result. It will be remembered that gates 61, 63, 65, 67 and 69 are inactive since the connections to the "A" sides of multivibrators 41, 43, 45, 57 and 49 are not energized when the multivibrators are in the "one" state.

On the next half cycle of the stepping signal the output of inverter 82 supplies an enabling signal 134 to the eight gates associated therewith. Gates 61 through 70 are inactive since there is no multivibrator set at "zero." Gates 52, 54, 56, 58 and 60 are active. As noted above, gate 60 will change multivibrator 41 to the "zero" state. Gates 52, 54, 56 and 58 will have no effect on the conduction pattern of the multivibrators since no incompatibility exists between the pairs of multivibrators connected by these four gates. The condition of the multivibrators is now shown by column 1B of FIG. 3. On the next succeeding half cycle 132 of the stepping signal, gates 61, 53, 55, 57 and 59 are enabled. This sets multivibrator 42 to the "zero" state but makes no change in the conduction pattern of the other multivibrators. The condition of conduction of the multivibrators is now shown in column 2A of FIG. 3. It will be seen that the operation of the counting chain will proceed in the manner described above until all of the multivibrators are set to "zero" as shown in column 6A.

The operation of the pattern suppression gate 68 first comes into play in the half cycle corresponding to column 5A of FIG. 3. At this time a "zero" is transferred from multivibrator 48 to multivibrator 49. Since multivibrator 42 is set to "zero" the third input of gate circuit 68 is energized. Similarly, in the half cycle corresponding to column 6A of FIG. 3, a "zero" is transferred from multivibrator 49 to multivibrator 50. Again the multivibrator 47 is set to "zero" so that the third input of gate 69 is energized.

On the half cycle of the stepping signal corresponding to column 6B of FIG. 3, multivibrator 50 acting through gate 70 sets multivibrator 41 to the "one" state. On the periods of the stepping signal corresponding to columns 7, 8, 9 and 10 of FIG. 3, the multivibrators are progressively reset to the "one" condition. On the half cycle following the period represented by column 10B, multivibrator 49 will reset multivibrator 50 to the "one" condition by way of gate 59 so that the multivibrators will again be in the condition shown by column 1A.

It will be seen from FIGS. 1 and 2 that output lead 30 will be at a relatively negative potential only when multivibrator 50 is set to "zero" and multivibrator 49 is in the "one" state. This will place both leads $IX^a$ and $X^b$ at a low potential and transistors 22 and 24 will be nonconducting. An examination of FIG. 3 will show that this condition exists only in the half cycle corresponding to column 10B. Similarly it will be seen that output lead 29 is energized only during that half cycle corresponding to column 9B when multivibrator 48 is set to the "zero" condition and multivibrator 47 is set to the "one" condition. Thus if the multivibrators shown in FIG. 1 follow the conduction sequence shown in FIG. 3, the output connections 21 through 30 will be energized in sequence and only one output will be energized at a time. It is to be understood that the operation of the pattern suppression loops are independent of the type of output circuit employed. Therefore the output circuit shown is by way of example only and the scope of the invention is not to be limited to or by this showing.

As disclosed in the said copending application of John L. Robinson, it has been found that in counter chains having six or more multivibrators in the chain, the multivibrators may assume states other than those represented by FIG. 3. For example, if multivibrators 41 through 50 are symmetrical multivibrators and bias potentials are applied simultaneously through the operation of a common power switch, it is extremely unlikely that all of the multivibrators will assume any one of the conduction patterns shown in FIG. 3. Furthermore even if the multivibrators were in one of the patterns of conduction shown in FIG. 3, noise pulses or momentary malfunctions of any one of the circuits might cause the multivibrator chain to vary from one of the patterns shown in FIG. 3. As disclosed in the above-mentioned copending application of Robinson, if no pattern suppression gate is provided, these patterns will continue to recirculate in the counter chain. These are spurious patterns of conduction in that they will tend to cause more or less than the desired number of output connections to be energized at a time and may cause each output connection to be energized more than once for every ten cycles of the stepping signal. It will now be shown that whereas gates 68 and 69 have no effect on the desired conduction patterns as represented by FIG. 3, they will operate to suppress the spurious conduction patterns just mentioned.

The action of the gates 68 and 69 in suppressing these spurious patterns will be explained with reference to FIG. 4. It can be shown that the number of incompatibilities around a loop of the type shown in FIG. 1 must be odd and that adjacent incompatibilities must be spaced by an even number of multivibrators. If they are not, the adjacent incompatibilities will either merge and hence cancel one another or they will become spaced by two multiivibrators after the first timing pulse. Therefore for purposes of illustration, the conduction pattern shown in column 1A of FIG. 4 will be assumed. In the conditions assumed for FIG. 4, multivibrators 41 and 42 and 45 through 48 are set to the "one" state and the remaining multivibrators are set to the "zero" state. Three incompatibilities exist; one between multivibrators 42 and 43, one between multivibrators 44 and 45, and the third one between multivibrators 48 and 49. The first half cycle of the stepping pulse will enable the odd numbered gates in the groups 51–59 and 61–69. Gate 51 will be actuated since it is supplied from the "B" side of multivibrator 41. However no change will occur as a result of the activation of this gate since multivibrator 42 is already in the "one" state. Similarly multivibrators 43 and 44 are in the "zero" state, multivibrators 45 and 46 are in the "one" state, multivibrators 47 and 48 are in the "one" state, and multivibrators 49 and 50 are in the "zero" state. Therefore no change occurs in the first half cycle of the timing wave. In the second half cycle of the timing wave, the even numbered gates in the groups 51 to 60 and 61 to 70 will be enabled. In this instance, gate 52 is energized by the "B" side of multivibrator 42 so that multivibrator 43 is set to the "one" condition. Multivibrator 45 will reset to the "zero" condition by way of gate 64, multivibrator 49 will be reset to the "one" condition by way of gate 58 and multivibrator 41 will be reset to the "one" condition by way of gate 70.

The operation of gate circuit 68 will not come into play until a zero is to be transferred from multivibrator 48 to multivibrator 49. This would normally occur in the half cycle of the timing signal corresponding to column 3B. This is schematically indicated in FIG. 4 by the numeral 68 at the bottom of column 3B of FIG. 4. At the time corresponding to column 3A multivibrator 42 is set to a "zero." Therefore, the third input of gate 68 is energized and the transfer will occur in the normal fashion. That is, no suppression of the spurious incompatibilities will result. On the next half cycle of the timing wave, that is, the half cycle represented by column 4A of FIG. 4, a "zero" is to be transferred from multivibrator 49 to multivibrator 50 by way of gate 69. At this time, multivibrator 47 is set to the "one" state so that the third input of gate 69 is not energized. Therefore multivibrator 50 will not be reset but will remain in the "one" condition. FIG. 4 shows that an incompatibility now exists on either side of multivibrator 49. On the half cycle of the timing wave corresponding to column 4B, the even numbered gates between the multivibrators are enabled so that multivibrator 49 is reset to a "one" by way of gate 58. As will be seen in FIG. 4, this has the effect of merging the two incompatibilities which existed on either side of multivibrator 49 thus cancelling both of the incompatibilities. This will leave the sngle incompatibility between multivibrators 45 and 46. It will be seen that the conduction pattern shown in column 4B of FIG. 4 corresponds exactly to the conduction pattern shown in column 3B of FIG. 3. Therefore the multivibrator chain will now continue to follow the desired pattern of FIG. 3 with no spurious incompatibilities.

Figures 5, 7, 9, 10:
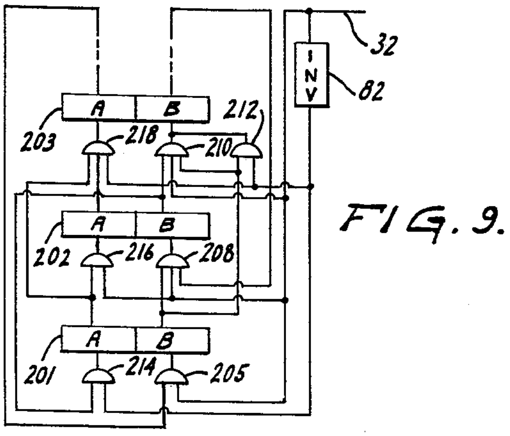
FIG. 7 is a table which illustrates the operation of a ten-count ring counter with only one pattern suppression loop.
FIG. 9 is a block diagram of a novel three-count ring counter, which may be extended to make an odd count counter of greater length.
FIG. 10 is a table which is illustrative of the operation of the odd count ring counter of FIG. 9.

In column 1A of FIG. 5, a conduction pattern having five incompatibilities, the maximum number that can be propagated in a scale of ten counter chains of the type shown in FIG. 1, is assumed. It will be seen from FIG. 5 that two of these incompatibilities are removed during half cycles 2B and 3A by the action of gate 68 which is not operative at this time due to the fact that multivibrator 42 is set to the "one" state. Gate 68 is again called into play during interval 4B. However at this time multivibrator 42 is in the "zero" state so that the third input of gate 68 is energized. During the half cycle represented by column 5A, the gate 69 is called into play. Since multivibrator 47 is in the "one" state, the zero will not be transferred from multivibrator 49 to multivibrator 50. This has the effect of merging the two incompatibilities as described above. Therefore in the half cycle corresponding to column 5B, the multivibrator chain will assume the conduction pattern having only one incompatibility. It will be seen that column 5B of FIG. 5 corresponds to column 5B of FIG. 4. Therefore the multivibrator chain has been restored to the desired pattern of conduction by the joint action of gates 68 and 69.

The connections between multivibrator 42 and multivibrator 43 has been shown in dotted lines to indicate that the counter chain may be extended by additional pairs of multivibrators to form a 12-count counter, a 14-count counter, etc. The unit by which the multivibrator chain is to be extended is shown in FIG. 6. The two multivibrators 143 and 144 of FIG. 6 may be identical to multivibrators 43 and 44 of FIG. 1. Similarly the gates 146, 147, 148 and 149 may correspond to gates 52, 53, 62 and 63 of FIG. 1. Again the odd numbered gates 147 and 149 will be coupled to input connection 32 while the even numbered gates 146 and 148 will be coupled to the output of inverter 82. Inclusion of one unit of the type shown in FIG. 6 in the counter of FIG. 1 will convert the counter to a 12-count counter, two units will convert the counter to a 14-count counter, etc.

Gates 68 and 69 have been referred to as pattern suppression gates. A pattern suppression loop is defined as the portion of the counter chain between the enabling multivibrator, i.e. multivibrator 42 or 47 of FIG. 1 and the pattern suppression gate. For example in FIG. 1, one pattern suppression loop comprises the portion of the chain between multivibrator 47 and gate 69 and a second pattern suppression loop comprises the portion of the chain between multivibrator 42 and pattern suppression gate 68. The "range" $r$ of a pattern suppression loop will be defined as two plus the number of multivibrators between the enabling multivibrator and the pattern suppression gate controlled thereby, counting in the direction in which the incompatibilities progress around the ring. Thus in FIG. 1, the loop from multivibrator 47 to gate 69 has a range of four while the suppression loop from multivibrator 42 to gate circuit 68 has a range of eight.

It can be shown that a pattern suppression loop is effective in suppressing a pair of incompatibilities only if this pair fall within the range of the loop. It can also be shown that the largest spacng between any pair of incompatibilities in a loop, which spacing is not greater than the spacing between any other pair of incompatibilities of the loop, is equal to two times the largest integer contained in $$\left(\frac{n}{6}\right)$$

where $n$ is the largest even integer contained in the number of multivibrators in the chain. In an even count counter chain $n$ will be equal to the number of multivibrators in the chain. It will be shown later that in an odd count chain $n$ is equal to one less than the number of multivibrators in the chain. Since it is immaterial which pair of incompatibilities is suppressed by the loop, it will be seen that, if the ranges are as given above, one pair of extraneous incompatibilities will always have a spacing which is less than the range of one of the loops. Thus in a ten-count ring counter $n=10$, the largest integer contained in $$\left(\frac{n}{6}\right)=1$$

therefore if there is more than one incompatibility in the loop, there will always be one pair of incompatibilities which is spaced by not more than two multivibrators.

Under these circumstances only a single pattern suppression loop having a range of four is required. That is, pattern suppression gate 68 is not required in FIG. 1 and may be replaced by a two input gate corresponding to gate 66 or 67, for example.

FIG. 7 is a table showing pattern suppression in a ten-count ring counter employing only a single pattern suppression gate 69. It will be noted that the omission of pattern suppression gate 68 merely delays the restoration of the desired pattern by one half cycle of the stepping signal.

Figure 8:
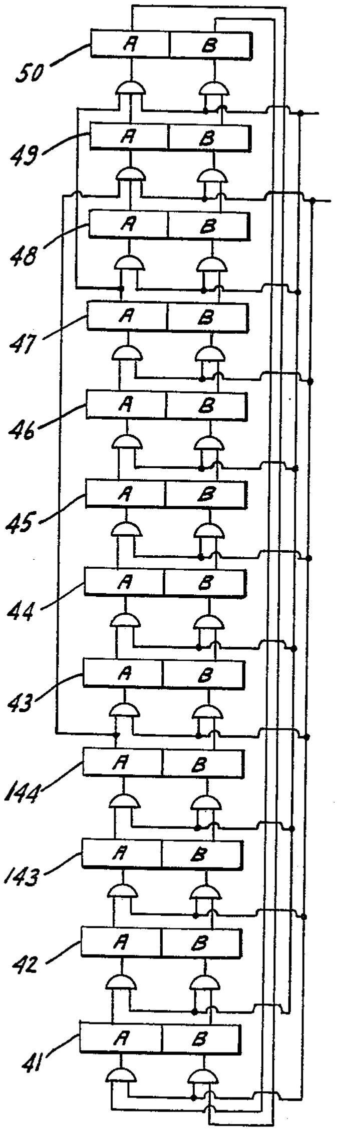
FIG. 8 is a block diagram of a 12-count counter chain, the output gates being omitted for simplicity of illustration.

If the circuit of FIG. 1 is increased to a 12-count ring counter as shown in FIG. 8 by the insertion of the circuit of FIG. 6 between multivibrators 42 and 43, it will be seen that $n=12$, that the largest integer in $$\left(\frac{n}{6}\right)=2$$

and that it is possible that the least spacing between adjacent incompatibilities may be equal to 4. Since a pair of incompatibilities spaced by four multivibrators will not be suppressed by a loop having a range of four it is necessary to provide a second loop having a range of $2^3$ or eight. Note that in a 12-count ring counter as described above, the input to gate circuit 68 is obtained from the output of multivibrator 144 rather than the output of multivibrator 42.

It can be shown that, in general, $(a-1)$ pattern suppression loops are required where $a$ is the largest integer such that $2^a$ is not greater than $(n-4)$. The "ranges" $r$ of the pattern suppression loop are $2^a, 2^{a-1} \ldots 2^2$. None of these ranges are superfluous. Applying this criterion to the 12-count ring counter it will be seen that $$n=12$$
$$(n-4)=8$$
$$a=3, \text{ and}$$
$$(a-1)=2$$

Since as stated above $(a-1)$ pattern suppression loops are required, two pattern suppression loops are required in a 12-count ring counter. The ranges of the loops are $$2^a=2^3=8 \text{ and } 2^{a-1}=2^2=4$$

It will be noted from the tables of FIGS. 4 through 6 that two types of incompatibilities are present. One incompatibility changes a multivibrator from a "zero" to a "one." The second type of incompatibility changes a multivibrator from a "one" to a "zero." It is convenient to define the incompatability which changes a multivibrator from a "zero" to a "one" as a positive incompatibility and the incompatibility which changes the multivibrator from a "one" to a "zero" as a negative incompatibility. It is convenient to refer to a pattern suppression loop which suppresses a negative incompatibility as a negative pattern suppression loop. Thus the two loops shown in FIG. 1 are both negative loops. Similarly, a loop which suppresses positive incompatibilities, i.e. a loop connected between the "B" sides of adjacent multivibrators and energized by the output of the "B" side of the appropriate multivibrator, is referred to as a positive loop. It can be shown that in an even count counter the required loops may be of any desired polarity. However more efficient pattern suppression is obtained if all pattern suppression loops are of the same polarity and the pattern suppression gates are arranged so that the gate for the loop having the longest range is first reached by an incompatibility, the remainder of the pattern suppression gates being arranged in order by decreasing range of the associated loop. Thus in FIG. 1 the pattern suppression gate 68, which forms a part of a loop having a range of eight, precedes pattern suppression gate 69 which forms a part of a loop having a range of four.

FIG. 9 of the drawing represents a novel three-count ring counter which may be extended to a five, seven, nine, etc. counter by the addition of one, two, three or more blocks of the type shown in FIG. 6. That is, the odd count counter of FIG. 9 is extended in exactly the same way that the even count counter of FIG. 1 is extended. The three-count ring counter of FIG. 9 comprises three multivibrators 201, 202 and 203 each of which may be identical to multivibrator 41, for example, of FIG. 1. The output of the "A" side of multivibrator 203 is connected to the "B" side of the multivibrator 201 by way of a two-input "and" gate 205. "And" gate 205 may be similar to "and" gate 70, for example, in FIG. 1. The second input of "and" gate 205 is energized from input lead 32 which corresponds to a similarly numbered lead in FIG. 1. The output of the "B" side of multivibrator 203, instead of being connected back to the "A" side of multivibrator 201 as it would be in an even count ring counter, is connected to one input of a three input "and" gate 208 which connects the "B" side of multivibrator 201 to the "B" side of multivibrator 202. A second input of "and" gate 208 is energized by the "B" side of multivibrator 201. The third input of gate 208 is energized from input connection 32. The "B" side of multivibrator 202 is connected to the "B" side of multivibrator 203 through a second three-input "and" gate 210. One input of "and" gate 210 is obtained from the output of the "B" side of multivibrator 202. The other two inputs are supplied by input connection 32 and the output of multivibrator 201, respectively. It should be understood that although gate 210 is energized by the outputs of two multivibrators, it is not a pattern suppression gate. A two-input "and" gate 212 connects the output of the "B" side of multivibrator 201 to the input of the "B" side of multivibrator 203. One input of "and" gate 212 is energized by the "B" side of multivibrator 201. The other input of "and" gate 212 is energized by the output of inverter 82 which corresponds to the similarly numbered element in FIG. 1. Therefore the "B" side of multivibrator 203 may be reset either by the "B" side of multivibrator 201 or to the "B" side of multivibrator 202. Since the two gates 210 and 212 are enabled alternately by the signal from input 32 and the signal from inverter 82, respectively, the outputs of these two gates may be coupled together directly without any further isolation such as might be provided by an "or" gate or the like.

The output of the "B" side of multivibrator 202 is also connected to the input of the "A" side of multivibrator 201 through a two-input "and" gate 214. One input of "and" gate 214 is supplied by the "B" side of multivibrator 202 and the second input is supplied by inverter 82. A two-input "and" gate 216 which has one input energized by the output of the "A" side of multivibrator 201 and a second input energized by input lead 32 connects the "A" side of multivibrator 201 to the "A" side of multivibrator 202. The three-input "and" gate 218 which is between the "A" side of multivibrator 202 and the "A" side of multivibrator 203 has one input energized by the output of the "A" side of multivibrator 201, a second input energized by the output of the "A" side of multivibrator 202 and a third input energized by the output of inverter 82.

The same conventions regarding actuation of the gate circuits of FIG. 9 by the multivibrators will be assumed for the circuit of FIG. 9 as was assumed for the circuit of FIG. 1. If it is assumed that the three multivibrators 201, 202 and 203 are each in the "zero" state as represented by column 1A of FIG. 10, it will be seen that the left input of gate 205, the left input of gate 216 and the center and left inputs of gate 218 will all be at a negative potential. The negative half cycle 130 of FIG. 1A will cause gate circuit 205 to reset multivibrator 201 to the "one" state. The second input of gate 216 will also be energized by the signal on input lead 32; however, since multivibrators 201 and 202 were initially in the same state, no change in state of multivibrator 202 will occur. The third input of gate 218 is not energized since this input is connected to the output of inverter 82. With multivibrator 201 reset to the "one" condition, the left-hand output of gate 205 will remain energized and the center and left-hand inputs of gate 208 will be energized. Also the left-hand input of gate 212 and the right-hand input of gate 210 will be energized by the output of the "B" side of multivibrator 201.

On the negative half cycle 134 from the output of inverter 82 a circuit will be completed by way of gate 212 which will reset multivibrator 203 to the "one" condition occupied by multivibrator 201. This will remove the energization of the left-hand side of gate 205. It will cause the right input of gate 208 to be energized but since the center input of gate 208 is not energized no connection will be established between the "B" side of multivibrator 201 and the "B" side of multivibrator 202.

On the next half cycle from input lead 32, the three inputs of "and" gate 208 are energized which causes multivibrator 201 to reset multivibrator 202 to the "one" condition. When multivibrator 202 is reset to the "one" condition, the three inputs of "and" gate 210 are also energized; however since multivibrator 203 is already in the "one" condition, this multivibrator will not be reset. The condtion of the three multivibrators is now illustrated by column 2B of FIG. 10.

On the next half cycle from inverter 82, gate 214 will be actuated which will reset multivibrator 201 to the "zero" condition. On the next half cycle the signal on lead 32 and the signal on the "A" side of multivibrator 201 will energize gate circuit 216 and cause multivibrator 202 to be reset to the "zero" condition. On the next half cycle, gate 218 will reset multivibrator 203 to the "zero" condition and restore the condition initially assumed in column 1A of FIG. 10. Thus the conduction pattern shown in the first three columns of FIG. 10 will repeat every three cycles of the stepping signal on input 32.

Figure 11:
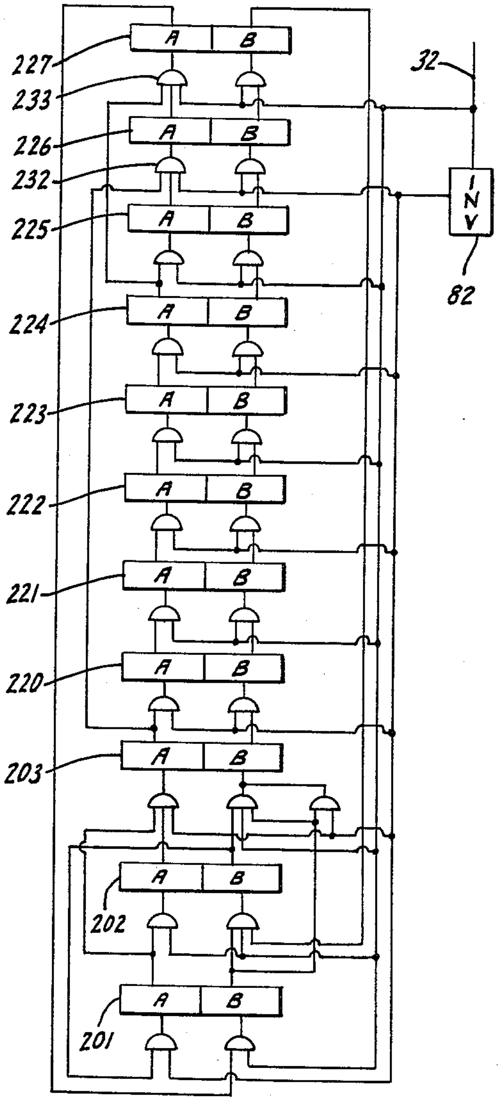
FIG. 11 is an 11-count ring counter which employs pattern suppression loops.

FIG. 11 shows an 11-count ring counter which corresponds to the circuit of FIG. 9 extended by four building blocks of the type shown in FIG. 6. That is, multivibrators 220 and 221 of FIG. 11 correspond to multivibrators 143 and 144 of FIG. 6. Similarly multivibrator pairs 222 and 223, 224 and 225, and 226 and 227 correspond to the multivibrators 143 and 144 of FIG. 6. The 11-count ring counter of FIG. 11 is provided with two pattern suppression gates 232 and 233 which correspond to pattern suppression gates 68 and 69 of FIG. 1. One input of gate 232 is supplied by the output of multivibrator 203 so that the pattern suppression loop associated with gate 232 has a range of eight. Similarly the one input of gate 233 is supplied from the "A" side of multivibrator 224 to form a second pattern suppression loop having a range of four. Again it should be understood that in an 11-count ring counter, only a single pattern suppression loop having a range of four is required. However the second loop has been shown by way of example. The second loop would be required in an odd count ring counter having a count of 13 or more. It can be shown that the patterns propagated through multivibrators 203 and 220 through 227 correspond to the patterns propagated through multivibrators 42 through 50 of FIG. 1. Therefore the pattern suppression gates of FIG. 11 function in the same way as in FIG. 1. The same criteria in selecting the number and range of pattern suppression loops can be employed in odd count ring counters as in even count ring counters provided the pattern suppression loops are all of negative polarity. The reason for this is that an odd count ring counter appears to have two less multivibrators for the propagation of negative incompatibilities than it does for the propagation of positive incompatibilities. That is, when propagating negative incompatibilities the loop appears to have one less bistable element than is actually present while, when propagating positive incompatibilities, the loop appears to have one more bistable element than is actually present. It lies within the scope of the invention to employ positive polarity pattern suppression loops in odd count counters. However in computing the number of pattern suppression loops which are required, $n$ must be taken as the even integer next larger than the number of bistable elements in the loop. Therefore one more pattern suppression loop may be required if the loops are of positive polarity than are required if the loops are of negative polarity. With an odd count ring counter, it is convenient to avoid using multivibrators 201 and 202 as part of any pattern suppression loop as this usually simplifies the design of the loops. This can always be done and it avoids possible complications in the operation of the pattern suppression loops.

While the invention has been described with reference to the preferred embodiments thereof, it will be apparent that various modifications and other embodiments thereof will occur to those skilled in the art within the scope of the invention. Accordingly I desire the scope of my invention to be limited only by the appended claims.

I claim:

1. A counter circuit comprising $n$ bistable elements where $n$ is any integer greater than five, signal enabled coupling means coupling said bistable elements in a closed chain, means to receive signals to be counted, means responsive to signals to be counted for supplying enabling signals to said signal enabled coupling mean, and $(a-1)$ pattern suppression loops, where $a$ is the largest integer such that $2^a$ is not greater than $(n-4)$, each loop comprising means coupling a respective one of said bistable elements to an associated coupling means other than the immediately following coupling means to disable said associated coupling means when said respective bistable element is in a selected one of its two stable states.

2. A counter circuit comprising $n$ bistable elements where $n$ is any integer greater than five, signal enabled coupling means coupling said bistable elements in a closed chain, means to receive signals to be counted, means responsive to signals to be counted for supplying enabling signals to said signal enabled coupling means, and $(a-1)$ pattern suppression loops where $a$ is the largest integer such that $2^a$ is not greater than $(n-4)$, each of said pattern suppression loops comprising means coupling a respective one of said bistable elements to an associated signal coupling means other than the immediately following coupling means to disable said associated coupling means when said respective bistable element is in a selected one of its two stable states, the number of bistable elements between the respective bistable element and its associated coupling means being different for each loop.

3. A counter circuit comprising $n$ bistable elements where $n$ is any integer greater than five, signal enabled coupling means coupling said bistable elements in a closed chain, means to receive signals to be counted, means responsive to said signals to be counted for supplying enabling signals to said signal enabled coupling means, and $(a-1)$ pattern suppression loops where $a$ is the largest integer such that $2^a$ is not greater than $(n-4)$, each of said pattern suppression loops comprising means coupling a respective one of said bistable elements to an associated signal coupling means other than the immediately following coupling means to disable said associated coupling means when said respective bistable element is in a selected one of its two stable states, the number of bistable elements between the respective bistable element and its associated coupling means being different for each loop, the number of bistable elements between the respective bistable element and the associated coupling means being equal to $(r-2)$ where $r$ has the values $2^a, 2^{a-1}, \ldots 2^2$.

4. A counter circuit comprising $n$ bistable elements, where $n$ is any integer greater than five, signal enabled coupling means coupling said bistable elements in a closed chain, means to receive signals to be counted, means responsive to signals to be counted for supplying enabling signals to said signal enabled coupling means, and $(a-1)$ pattern suppression loops, where $a$ is the largest integer such that $2^a$ is not greater than $(n-4)$, each of said pattern suppression loops comprising means coupling a respective one of said bistable elements to an associated signal coupling means other than the immediately following coupling means to disable said associated coupling means when said respective bistable element is in a selected one of its bistable states, the number of bistable elements between the respective bistable element and its associated coupling means being different for each loop, the number of bistable elements between the respective bistable element and the associated coupling means being equal to $(r-2)$ where $r$ has the value $2^a, 2^{a-1}, \ldots 2^2$, said associated coupling means being arranged in the direction of information propagation in said chain in descending order of the number of bistable elements between the respective bistable element and its associated coupling means.

5. A counter circuit comprising a plurality of bistable elements, a like plurality of signal enabled coupling means coupling said bistable elements together to form a closed chain, means for supplying stepping signals to each of said coupling means, said signal enabled coupling means transferring information from one bistable element to the next only in response to the joint application of said stepping signals and the output signal of the preceding bistable element in said closed chain, one of said coupling means which couples a first bistable element to a second bistable element in said closed chain transferring information only in response to the joint application of said stepping signals, the output signal of said first bistable element in said closed chain and the output of a third bistable element which precedes said first bistable element in said chain by an even number of bistable elements.

6. A counter circuit comprising $n$ bistable elements, where $n$ is an integer greater than five, signal enabled coupling means coupling said bistable elements together to form a closed chain, means for supplying stepping signals to said coupling means, said signal enabled coupling means being arranged to transfer information from one bistable element to the next only in response to the joint application of said stepping signals and the output signal of the preceding bistable element in said closed chain, $(a-1)$ of said signal coupling means being additionally arranged to transfer information only in response to the joint application of said stepping signals, the output of the preceding bistable element in said closed chain and the output signal of a third bistable element elsewhere in said chain, where $a$ is the largest integer such that $2^a$ is not greater $(n-4)$.

7. A counter circuit comprising $n$ bistable elements, where $n$ is an integer greater than five, signal enabled coupling means coupling said bistable elements together to form a closed chain, said coupling means being connected to provide for transfer of data indicative of either stable state of the preceding bistable element between bistable elements in said chain, and means for supplying stepping signals to said counter circuit, $(a-1)$ of said signal coupling means being enabled to transfer information only upon the joint application of the output signal of the immediately preceding bistable element in said closed chain, said stepping signals, and the output of a third bistable element elsewhere in said closed chain, where $a$ is the largest integer such that $2^a$ is not greater than $(n-4)$, the remainder of said coupling means being jointly responsive to said stepping signals and the output signal of the preceding bistable element in said closed chain.

8. A counter which comprises a plurality of bistable elements each having an "A" side and a "B" side, each side having an input and an output, means coupling said bistable elements in cascade to form a closed loop, said last-mentioned means including a first plurality of multiple input coincident gate means, each gate means of said first plurality having one input coupled to the output of the "A" side of a bistable element and its output coupled to the input of the "A" side of the following bistable element, a second plurality of multiple input coincident gate means, each gate means of said second plurality having one input coupled to the output of the "B" side of one of said bistable elements and its output coupled to the input of the "B" side of the following bistable element, the two gate means associated with the same two bistable elements constituting a pair, a source of stepping signals, said source providing first and second series of stepping signals, the stepping signals of said first series occurring alternately in time with signals of said second series, means for supplying said first series of stepping signals to alternate pairs of said coincident gate means, means for supplying said second series of signals to the remaining pairs of said coincident gate means, at least one of said gate means having an additional input connected to a bistable element which precedes it by an odd number of bistable elements.

9. A counter circuit which comprises $n$ bistable elements, each having an "A" side and a "B" side, where $n$ is any integer greater than five, each side having an input and an output, means coupling said bistable elements in cascade to form a closed loop, said last-mentioned means including a first plurality of multiple input coincident gate means, each gate means of said first plurality having one input coupled to the output of the "A" side of a bistable element and its output coupled to the input of the "A" side of the following bistable element, a second plurality of multiple input coincident gate means, each gate means of said second plurality having one input coupled to the output of the "B" side of one of said bistable elements and its output coupled to the input of the "B" side of the following bistable element, the two gate means associated with the same two bistable elements constituting a pair, a source of stepping signal, said source providing first and second series of stepping signals, the stepping signals of said first series occurring alternately in time with the signals of said second series, means for supplying said first series of stepping signals to alternate pairs of said coincident gate means, means for supplying said second series of signals to the remaining pairs of said coincident gate means, $(a-1)$ of said coincident gate means having an additional input connected to a bistable element which precedes it by an odd number of bistable elements, where $a$ is the largest integer such that $2^a$ is not greater than $(n-4)$.

10. A counter which comprises $n$ bistable elements each having an "A" side and a "B" side, where $n$ is any integer greater than five, each side having an input and an output, means coupling said bistable elements in cascade to form a closed loop, said last-mentioned means including a first plurality of multiple input coincident gate means, each gate means of said first plurality having one input coupled to the output of the "A" side of a bistable element and its output coupled to the input of the "A" side of the following bistable element, a second plurality of multiple input coincident gate means, each gate means of said second plurality having one input coupled to the output of the "B" side of one of said bistable elements, and its output coupled to the input of the "B" side of the following bistable element, the two gate means associated with the same two bistable elements constituting a pair, a source of stepping signals, said source providing first and second series of stepping signals, the stepping signals of said first series occurring alternately in time with signals of said second series, means for supplying said first series of stepping signals to alternate pairs of said coincident gate means, means for supplying said second series of stepping signals to the remaining pairs of said coincident gate means, $(a-1)$ gate means selected from the aforesaid gate means having an additional input connected to a respective bistable element other than the preceding bistable element where $a$ is the largest integer such that $2^a$ is not greater than $(n-4)$, the number of bistable elements between each of said selected gate means and its associated bistable element being different for each selected gate means, said number of bistable elements between a selected gate means and its associated bistable element being equal to $(r-2)$ where $r$ has a value selected from the set $2^a, 2^{a-1}, \ldots 2^2$.

11. A counter as in claim 10 wherein said selected gate means are all associated with the "A" sides of the bistable elements.

12. A counter as in claim 10 wherein said selected gate means are arranged in the direction of information propagation and said chain in descending order of the number of bistable elements between the selected gate means and its associated bistable element.

13. An odd count counter circuit comprising a source of stepping signals, said source providing first and second series of stepping signals, the signals of said first series occurring alternately in time with signals of said second series, an odd number of bistable elements, each bistable element having first and second inputs and first and second outputs, a first multiple input coincident gate means, said first gate means having one input coupled to said first output of said first bistable element and a second input coupled to said source to receive said first series of stepping signals and its output coupled to said first input of said second bistable element, a second multiple input coincident gate means said second gate means having one input coupled to said first output of said first bistable element, a second input coupled to said first output of said second bistable element and a third input coupled to said source to receive said second series of stepping signals, the output of said second gate means being coupled to said first input of said third bistable element, a third multiple input coincident gate means, said third gate means having one input coupled to said second output of said first bistable element, a second input coupled to said source to receive said stepping signals of said first series, and a third input coupled to said second output of the final bistable element in said series, the output of said third coincident gate means being coupled to said second input of said second bistable element, a fourth multiple input coincident gate means, said fourth gate means having one input coupled to the said second output of said second bistable element, a second input coupled to said source to receive said first series of stepping signals, and a third input coupled to said second output of said first bistable element, the output of said fourth gate means being coupled to said first input of said third bistable element, a fifth multiple input coincident gate means, said fifth gate means having one input coupled to said second output of said first bistable element and a second input coupled to said source to receive said second input coupled to said source to receive said second series of stepping signals, the output of said fifth gate means being coupled to said second input of said third bistable element, a sixth multiple input coincident gate means, said sixth gate means having one input coupled to said first output of the final bistable element and a second input coupled to said source to receive said first series of stepping signals and a seventh multiple input coincident gate means, said seventh gate means having one input coupled to said second output of said second bistable element and a second input coupled to said source to receive said second series of stepping signals, the output of said sixth gate means being coupled to said second input of said first bistable element, the output of said seventh gate means being coupled to said first input of said first bistable element.

References Cited in the file of this patent

UNITED STATES PATENTS

| | | |
|---|---|---|
| 2,771,551 | Hampton | Nov. 20, 1956 |
| 2,943,248 | Ritchey | June 28, 1960 |